United States Patent
Ohmori (10) Patent No.: US 10,139,587 B2
(45) Date of Patent: Nov. 27, 2018

(54) LENS BARREL AND OPTICAL APPARATUS (71) Applicant: CANON KABUSHIKI KAISHA, Tokyo (JP)

(72) Inventor: Katsumi Ohmori, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 197 days.

(21) Appl. No.: 15/357,404

(22) Filed: Nov. 21, 2016

(65) Prior Publication Data
US 2017/0153412 A1 Jun. 1, 2017

(30) Foreign Application Priority Data
Nov. 26, 2015 (JP) ................. 2015-231157

(51) Int. Cl.
G02B 7/10 (2006.01)
G02B 5/00 (2006.01)
G02B 7/02 (2006.01)

(52) U.S. Cl.
CPC ............. G02B 7/10 (2013.01); G02B 5/005 (2013.01); G02B 7/021 (2013.01); G02B 7/102 (2013.01)

(58) Field of Classification Search
CPC .......... G02B 7/10; G02B 5/005; G02B 7/021; G02B 7/102
USPC .......... 359/684, 694, 696, 698, 811
See application file for complete search history.

(56) References Cited

U.S. PATENT DOCUMENTS

| 2005/0254145 A1* | 11/2005 | Tsuzuki | G02B 7/021 359/701 |
| 2007/0024991 A1 | 2/2007 | Takeda et al. | |
| 2008/0117527 A1* | 5/2008 | Nuno | G02B 7/021 359/687 |

FOREIGN PATENT DOCUMENTS

| JP | H06018767 A | 1/1994 |
| JP | 2005091731 A | 4/2005 |
| JP | 2011039107 A | 2/2011 |
| JP | 2013246429 A | 12/2013 |

* cited by examiner

Primary Examiner — James Greece
(74) Attorney, Agent, or Firm — Rossi, Kimms & McDowell LLP (57) ABSTRACT The lens barrel includes a first rotatable member rotatable to move a focusing lens in an optical axis direction, a first aperture stop unit including a first light-blocking member and a second rotatable member rotatable to move the first light-blocking member, a third rotatable member to be rotated by receiving a rotation of the first rotatable member, a first mechanism configured to, in the variation of magnification, convert a relative movement of the second and third rotatable members into a rotation of the second rotatable member, and a second mechanism configured to, in the focusing, transmit the rotation of the first rotatable member to the third rotatable member to rotate the third rotatable member and transmit the rotation of the third rotatable member to the second rotatable member to rotate the second rotatable member.

9 Claims, 5 Drawing Sheets

LENS BARREL AND OPTICAL APPARATUS

BACKGROUND OF THE INVENTION

Field of the Invention

The present invention relates to a lens barrel used for optical apparatuses such as image capturing apparatuses and interchangeable lenses, and particularly to a lens barrel including a main aperture stop and a sub aperture stop.

Description of the Related Art

Lens barrels are each provided with an aperture stop for controlling a light amount from an object in order to achieve a proper exposure in image capturing.

In the aperture stop, a diameter of a light-passing aperture formed by multiple light-blocking blades (the diameter is hereinafter referred to as "an aperture diameter") is set automatically depending on a photometry result or manually by a user. When the aperture diameter is changed depending on the photometry result, an actuator such as a stepping motor is used to drive the light-blocking blades in their opening/closing direction.

Furthermore, some lens barrels are each provided with, separately from a main aperture stop for mainly controlling the light amount as described above, a sub aperture stop for correcting a fully-opened aperture diameter in variation of magnification and focusing or for cutting flare. Such a sub aperture stop also can change its aperture diameter by moving multiple light-blocking blades in their opening/closing direction. However, providing actuators for the respective main and sub aperture stops hinders miniaturization of the lens barrel.

Japanese-Patent Laid-Open Nos. 2011-039107 and 06-018767 disclose lens barrels each including a mechanism for causing a main or sub aperture stop to perform opening/closing operations without using an actuator. In the lens barrel disclosed in Japanese-Patent Laid-Open No. 2011-039107, a driving arm, which extends obliquely to an optical axis direction (in which an optical axis extends) from a rotatable member provided to the sub aperture stop fixed in the optical axis direction, engages with an object side movable member. With a movement of the movable member in the optical axis direction, the rotatable member is rotated in a circumferential direction about the optical axis to change the aperture diameter of the sub aperture stop. In the lens barrel disclosed in Japanese-Patent Laid-Open No. 06-018767, an aperture stop (main aperture stop) is moved in the optical axis direction with variation of magnification and focusing, and a rotatable member (relaying member) provided to the aperture stop engages with an aperture interlocking member fixed in the optical axis direction in the variation of magnification and the focusing and has a sloped engaging face that engages with the aperture interlocking member. The rotatable member provided to the aperture stop is rotated in a circumferential direction about the optical axis in the variation of magnification and the focusing to change the aperture diameter of the aperture stop.

However, the lens barrel disclosed in Japanese-Patent Laid-Open No. 2011-039107 has a configuration that cannot change the aperture diameter of the sub aperture stop in only one of the variation of magnification and the focusing. Providing two sub aperture stops, one of which changes its aperture diameter in the variation of magnification and the other of which changes its aperture diameter in the focusing, separately from the main aperture stop may increase an entire length of the lens barrel or restrict an optical design freedom of the lens barrel. On the other hand, the lens barrel disclosed in Japanese-Patent Laid-Open No. 06-018767 includes the aperture stop whose aperture diameter is changed in the variation of magnification and the focusing. However, the aperture stop uses only one cam to change the aperture diameter, which makes it difficult to change the aperture diameter appropriately for combinations of various focal length and object distances.

SUMMARY OF THE INVENTION

The present invention provides a lens barrel including a sub aperture stop separately from a main aperture stop and being capable of changing an aperture diameter of the sub aperture stop in variation of magnification and focusing without using an actuator dedicated for the sub aperture stop. The present invention further provides an optical apparatus including the sub aperture stop.

The present invention provides as an aspect thereof a lens barrel including a magnification-varying lens movable in an optical axis direction, in which an optical axis of the lens barrel extends, to perform variation of magnification, a focusing lens movable in the optical axis direction to perform focusing, a first rotatable member rotatable in a circumferential direction about the optical axis to move the focusing lens in the optical axis direction, a first aperture stop unit including a first light-blocking member and a second rotatable member rotatable in the circumferential direction to move the first light-blocking member, a third rotatable member to be rotated in the circumferential direction by receiving a rotation of the first rotatable member, a first mechanism configured to, in the variation of magnification, convert a relative movement of the second and third rotatable members in the optical axis direction into a rotation of the second rotatable member in the circumferential direction, and a second mechanism configured to, in the focusing, transmit the rotation of the first rotatable member to the third rotatable member to rotate the third rotatable member and transmit the rotation of the third rotatable member to the second rotatable member to rotate the second rotatable member.

The present invention provides as another aspect thereof an optical apparatus provided with the above lens barrel.

Further features and aspects of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

Embodiment 1

Figure 2:
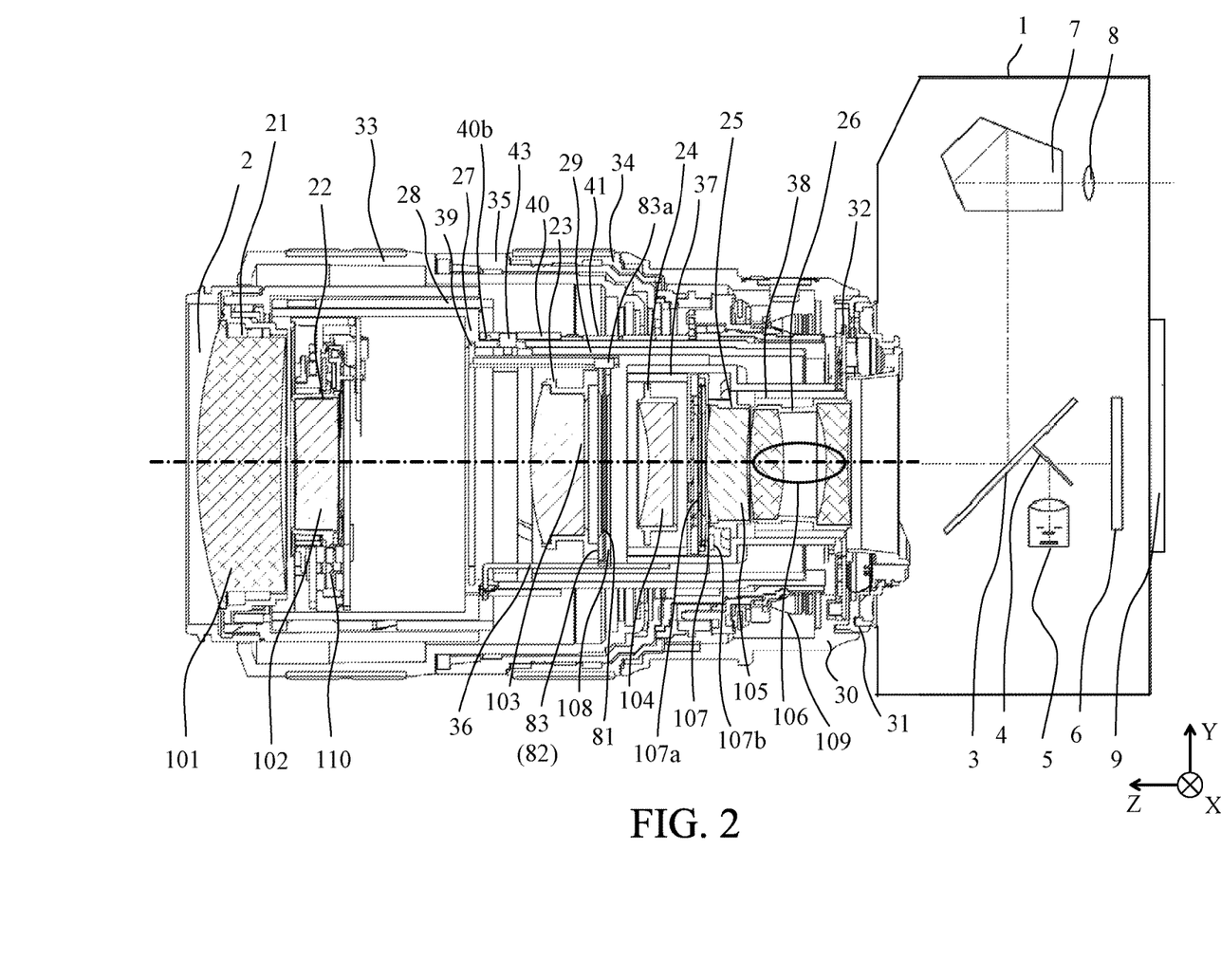
FIG. 2 is a section illustrating a configuration of an image capturing system including the interchangeable lens of Embodiment 1 and a single-lens reflex camera.

FIG. 2 illustrates a configuration of an image capturing system including an interchangeable lens 2 as an optical apparatus provided with a lens barrel that is a first embodiment (Embodiment 1) of the present invention and an lens-interchangeable single-lens reflex digital camera (hereinafter referred to as "a camera body") 1. In FIG. 2, an optical axis direction in which an optical axis (illustrated by a dashed-dotted line in the drawing) extends is defined as a Z direction. Furthermore, a horizontal direction and a vertical direction, which are two radial directions orthogonal to each other, are respectively defined as an X direction and a Y direction.

In the camera body 1, a main mirror 3 in a state of being disposed on an optical path of a light flux from the interchangeable lens 2 as illustrated in FIG. 2 reflects part of the light flux to introduce the reflected light flux to a finder optical system (7, 8) and transmits another part of the light flux.

A sub mirror 4 disposed behind the main mirror 3 reflects the light flux transmitted through the main mirror 3 to introduce the reflected light flux to a focus detection unit 5. The main and sub mirrors 3 and 4 are retractable so as to be moved out of the optical path by a drive mechanism (not illustrated).

The focus detection unit 5 includes an AF sensor for performing focus detection (detection of a focus state of the interchangeable lens 2) by a phase difference detection method. The AF sensor includes a separator lens, a secondary imaging lens and two pairs of light-receiving element rows (line sensors). The separator lens divides the introduced light flux into two light fluxes in each of the X and Y directions. The secondary imaging lens re-images each of the divided light fluxes. Each pair of the line sensors photoelectrically converts two object images formed by the two divided light fluxes. Each line sensor is formed such that an array of multiple light-receiving elements extends in the X or Y direction. The paired line sensors photoelectrically convert the two object images into paired image signals.

An image sensor 6 is constituted by a CCD sensor or a CMOS sensor. On a light-receiving surface (image capturing surface) of the image sensor 6, an object image is formed by the light flux from the interchangeable lens 2. The image sensor 6 photoelectrically converts the object image to output an analog image capturing signal. An electronic focal-plane shutter (not illustrated) controls an exposure amount of the image sensor 6.

The finder optical system is constituted by a penta prism 7 and an eye-piece lens 8. A display panel displays images produced from the image capturing signals from the image sensor 6 and various information.

In the camera body 1 thus configured, in response to an operation of a release button (not illustrated), an autofocus (AF) process and an autoexposure (AE) process are performed, and then the image sensor 6 is exposed and a captured image thereby produced are recorded and displayed.

The interchangeable lens 2 houses an image capturing optical system including, in order from an object side, a first lens unit 101, a second lens unit 102, a third lens unit 103, a fourth lens unit 104, a fifth lens unit 105 and a sixth lens unit 106. The first to sixth lens units 101 to 106 are respectively held by a first holding barrel 21, a second holding barrel 22, a third holding barrel 23, a fourth holding barrel 24, a fifth holding barrel 25 and a sixth holding barrel 26.

Furthermore, the image capturing optical system includes an electronic aperture stop unit (second aperture stop unit; hereinafter referred to as "a main diaphragm unit") 107 and a sub aperture stop unit (first aperture stop unit; hereinafter referred to as "a sub diaphragm unit") 108. The main diaphragm unit 107 is disposed on the object side further than the fifth lens unit 105 and is fixed to the fifth holding barrel 25. The sub diaphragm unit 108 is disposed on an image side further than the third lens unit 103 and is fixed to the third holding barrel 23. The main and sub diaphragm units 107 and 108 block part of the light flux passing through the image capturing optical system and then entering the camera body 1.

The main diaphragm unit 107 includes a main diaphragm actuator 107b dedicated therefor and driven by a drive signal from an electric circuit substrate 32.

The main diaphragm unit 107 moves, by the main diaphragm actuator 107b, multiple main diaphragm blades (second light-blocking members) 107a in their opening/closing direction to change its aperture diameter that is a size of its aperture. The main diaphragm unit 107 has a role to control a light amount passing through the image capturing optical system and then entering the camera body 1.

The sub diaphragm unit 108 moves multiple sub diaphragm blades (first light-blocking members) 81 in their opening/closing direction to change its aperture diameter that is a size of its aperture. However, the sub diaphragm unit 108 does not include an actuator dedicated therefor, and thereby the sub diaphragm members 81 are moved in their opening/closing direction by a sub diaphragm opening/closing mechanism (not illustrated) in variation of magnification and focusing. The sub diaphragm unit 108 has a role to correct a fully-opened aperture diameter in the variation of magnification and the focusing and to cut flare.

The interchangeable lens 2 includes a guide barrel (base barrel) 27, a first cam barrel 28 and a second cam barrel 29, which will be described later. A relative movement of the guide barrel 27 and the first and second cam barrels 28 and 29 causes each lens unit to move in the optical axis direction. In the variation of magnification, the first, second, third and fifth lens units 101, 102, 103 and 105, each of which is a magnification-varying lens, are separately moved in the optical axis direction. The fourth and sixth lens units 104 and 106 are moved integrally with the fifth lens unit 105 in the optical axis direction.

In the focusing (AF), the fourth and sixth lens units 104 and 106, each of which is a focusing lens, receive a drive force from a focus unit 109 to be moved in the optical axis direction.

Furthermore, the second lens unit 102 receives a drive force from an image stabilizing unit 110 to be moved in a plane orthogonal to the optical axis, which corrects image blur due to hand jiggling.

A rigid barrel 30 is provided with a mount member 31 fixed thereto by screws or the like. The mount member 31 enables detachable attachment of the interchangeable lens 2 to the camera body 1. The rigid barrel 30 is provided with an electric circuit substrate 32 fixed thereto. The electric circuit substrate 32 is provided with a control circuit configured to control operations of the interchangeable lens 2 and perform various calculations. The rigid barrel 30 is unmoved (fixed) in the variation of magnification and the focusing.

The rigid barrel 30 is fixed to the guide barrel 27. The guide barrel 27 is provided with straight groove portions (not illustrated) for straightly guiding the first, second, third and fifth lens units 101, 102, 103 and 105 in the optical axis direction.

The first cam barrel 28 is disposed outside the guide barrel 27, and the second cam barrel 29 is disposed inside the guide barrel 27. The first cam barrel 28 is provided with cam groove portions (not illustrated) for separately moving the first and second lens units 101 and 102 in the optical axis direction. The second cam barrel 29 is provided with cam groove portions (not illustrated) for separately moving the third and fifth lens units 103 and 105 in the optical axis direction. The first, second, third and fifth holding barrels 21, 22, 23 and 25 are each provided with cam followers (not illustrated) engaging with corresponding ones of the straight groove portions and corresponding ones of the cam groove portions. The first and second cam barrels 28 and 29 are rotated in the circumferential direction with respect to the guide barrel 27 to move the first, second, third and fifth lens units 101, 102, 103 and 105 in the optical axis direction. With the movement of the fifth lens unit 105, the fourth and sixth lens units 104 and 106 are moved in the optical axis direction.

A zoom operation ring 33 is operated by a user to be rotated in the circumferential direction when the variation of magnification is performed. The zoom operation ring 33 is connected to the first and second cam barrels 28 and 29 via a connecting member (not illustrated). Therefore, a rotational operation of the zoom operation ring 33 causes the first and second cam barrels 28 and 29 to rotate, and thereby the first to sixth lens units 101 to 106 are moved in the optical direction to change a focal length of the image capturing optical system.

A focus operation ring 34 is operated by the user to be rotated in the circumferential direction when manual focusing (MF) is performed. An exterior ring 35 is fixed to the focus unit 109. The exterior ring 35 rotatably holds at its outer circumferential portion the focus operation ring 34. A rotational operation of the focus operation ring 34 transmits the rotation thereof to a first focus cam ring 37 and a second focus cam ring 38 via a focus key 36 serving as an output portion of the focus unit 109. When the AF is performed, the drive force (rotational force) from the focus unit 109 is transmitted to the first and second focus cam rings 37 and 38 via the focus key 36. The focus key 36 is supported rotatably in the circumferential direction.

The first focus cam ring 37 and the second focus cam ring 38 are respectively provided with cam groove portions (not illustrated) for moving the fourth lens unit 104 and the sixth lens unit 106 in the optical axis direction. The fifth holding barrel 25 is provided with straight groove portions (not illustrated) for straightly guiding the first and second lens units 104 and 106 in the optical axis direction. The fourth and sixth holding barrels 24 and are provided with cam followers (not illustrated) engaging with the straight groove portions of the fifth holding barrel 25 and engaging respectively with the cam groove portions of the first and second focus cam barrels 37 and 38. With this configuration, the rotation of the first and second focus cam rings 37 and 38 causes the fourth and sixth lens units 104 and 106 to move in the optical axis direction, which performs the focusing (AF and MF).

Figure 1:
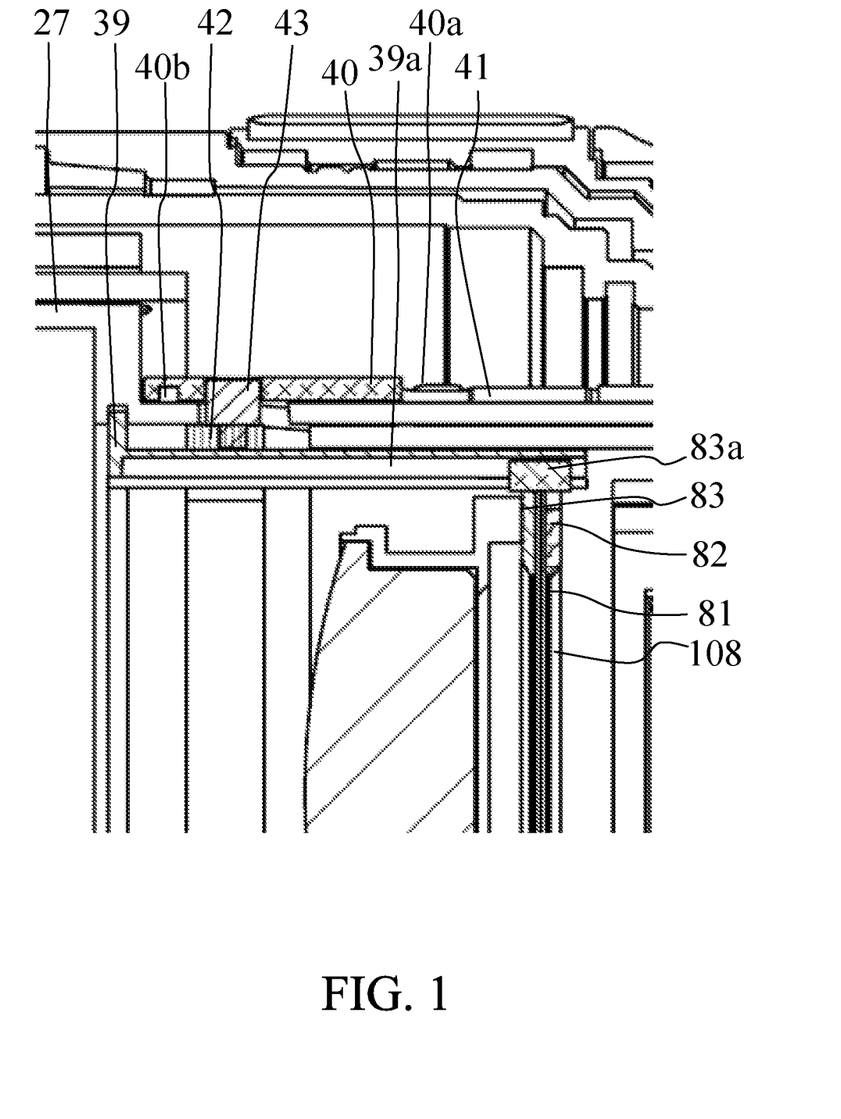
FIG. 1 is a partial sectional view of an interchangeable lens that is Embodiment 1 of the present invention.
Figure 3:
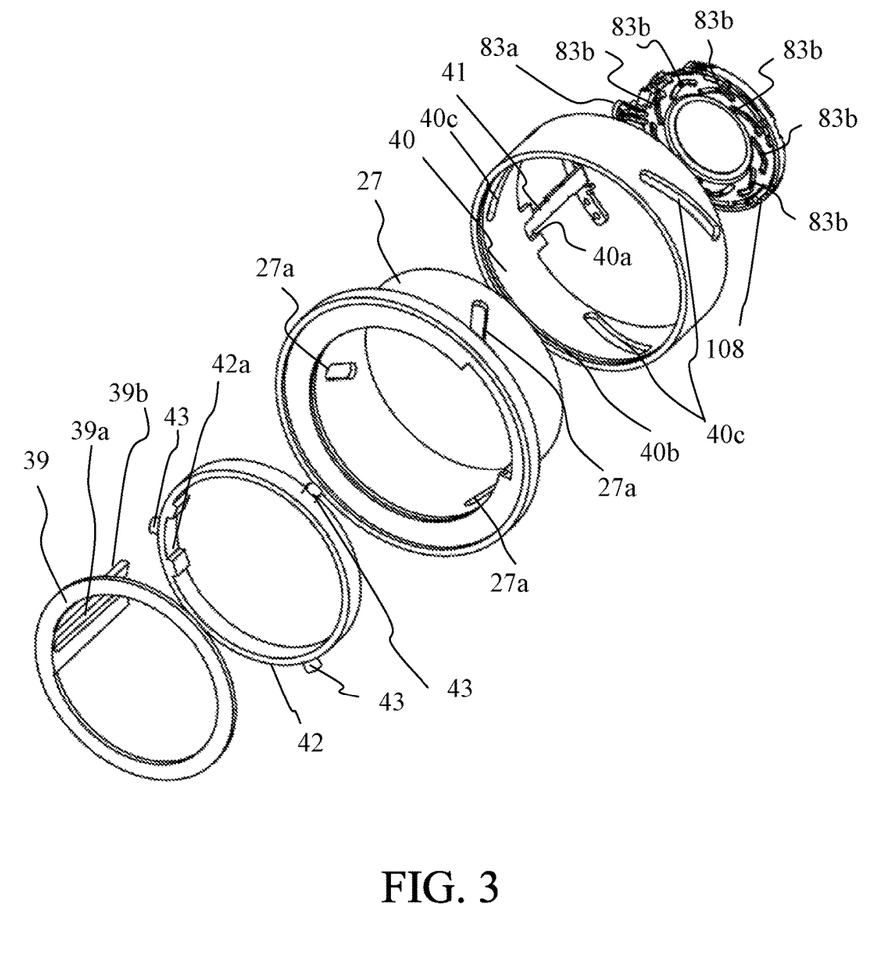
FIG. 3 is an exploded perspective view of the interchangeable lens of Embodiment 1.

Next, description will be made of a configuration of the sub diaphragm unit 108 and the sub diaphragm opening/closing mechanism configured to change the aperture diameter of the sub diaphragm unit 108 with referring to FIGS. 1 and 3. FIGS. 1 and 3 illustrate the configuration of the sub diaphragm unit 108 and its surroundings.

First, description will be made of the configuration of the sub diaphragm unit 108. The sub diaphragm unit 108 includes multiple diaphragm blades as light-blocking members, a sub diaphragm base member (hereinafter simply referred to as "a base member") 82 and a blade opening/closing member 83 as a second rotatable member. The blade opening/closing member 83 is provided with, at its surface orthogonal to the optical axis, multiple cam groove portions 83*b* (in FIG. 3) for moving the diaphragm blades 81 in their opening/close direction and is rotated in the circumferential direction. Each of the diaphragm blades 81 has, on its both faces in the optical axis direction, boss portions (not illustrated). One of the boss portions engages with a hole portion (not illustrated) formed in the base member 82, and the other thereof engages with a cam groove portion 83*b* formed in the blade opening/closing member 83. The blade opening/closing member 83 is provided with multiple cam groove portions 83*b* for the respective diaphragm blades 81. The rotation of the blade opening/closing member 83 causes the cam groove portion 83*b* with which the other boss portion engages to move (rotate) each diaphragm blade 81 about the one boss portion engaging with the hole portion of the base member 82, which changes the aperture diameter of the sub diaphragm unit 108.

Next, description will be made of a first mechanism, which is a first part of the sub diaphragm opening/closing mechanism, configured to change the aperture diameter of the sub diaphragm unit 108 in the variation of magnification. The blade opening/closing member 83 is provided with a cam follower 83*a* engaging with a cam groove portion 39*a* formed in a sub diaphragm driving member 39 serving as a third rotatable member. The sub diaphragm driving member 39 is provided with an extending portion 39*b* that straightly extends in the optical axis direction. The cam groove portion (first cam) 39*a* is formed in the extending portion 39*b* so as to extend in the optical axis direction with a slope with respect to the optical axis direction.

The sub diaphragm driving member 39 engages with a circumferential groove portion formed in the guide barrel 27 so as to be rotatable at a fixed position in the optical axis direction. The sub diaphragm driving member 39 does not rotate with respect to the guide barrel 27 in the variation of magnification and rotates with respect thereto in the focusing. As described above, the sub diaphragm unit 108 is fixed to the third holding barrel 23 and is moved in the variation of magnification together with the third holding barrel 23 in the optical axis direction. Thus, in the variation of magnification, the cam groove portion 39*a* of the sub diaphragm driving member 39 not rotated causes the blade opening/closing member 83 moving in the optical axis direction to rotate in the circumferential direction via its cam follower 83*a*. In other words, the first mechanism is configured to, in the variation of magnification, convert a relative movement of the blade opening/closing member (second rotatable member) 83 and the sub diaphragm driving member (third rotatable member) 39 in the optical axis direction into a rotation of the blade opening/closing member 83 in the circumferential direction. Thereby, the aperture diameter of the sub diaphragm unit 108 is changed.

A configuration may be employed in which a first cam equivalent to the cam groove portion 39*a* is provided to the blade opening/closing member 83 and a cam follower equivalent to the cam follower 83*a* is provided to the sub diaphragm driving member 39.

Next, description will be made of a second mechanism, which is a second part of the sub diaphragm opening/closing mechanism, configured to change the aperture diameter of the sub diaphragm unit 108 in the focusing. In the focusing, as described above, the focus key 36 is rotated in the circumferential direction. The focus key 36 is connected to the focus unit 109 via a fixed-position rotatable ring 40 and a focus connecting key 41. The focus key 36 is fixed to the fixed-position rotatable ring 40 with screws. The fixed-position rotatable ring 40 is provided with an engaging portion 40a with which the focus connecting key 41 engages in the circumferential direction. Thus, in the focusing, these focus key 36, focus connecting key 41 and fixed-position rotatable ring 40 are rotated by the same rotation amount with the movement of the fourth and sixth lens units 104 and 106 in the optical axis direction. The focus connecting key 41 and the fixed-position rotatable ring 40 serve as a first rotatable member.

The fixed-position rotatable ring 40 is provided with a circumferential groove portion 40b with which a protruding portion (not illustrated) provided to the guide barrel 27 so as to protrude in the radial direction engages. With this configuration, in the focusing, the fixed-position rotatable ring 40 is rotated at a fixed position in the optical axis direction. The sub diaphragm driving member 39 engages at its extending portion 39b with an engaging groove portion 42a formed in a focus connecting ring 42. The focus connecting ring 42 is rotatable so as to transmit the rotation of the focus connecting key 41 (fixed-position rotatable ring 40) to the sub diaphragm driving member 39. The focus connecting ring 42 is supported by the fixed-position rotatable ring 40 via cam followers 43. In the focusing, the sub diaphragm driving member 39, focus connecting ring 42 and blade opening/closing member 83 are rotated by the same rotation amount, and the rotation of the blade opening/closing member 83 causes the aperture diameter of the sub diaphragm unit 108 to change.

As just described, this embodiment provides the main diaphragm unit 107 and the sub diaphragm unit 108 separately from each other. Furthermore, this embodiment enables, while providing the main diaphragm actuator 107b only to the main diaphragm unit 107 in order to prevent an increase in size of the lens barrel, changing the aperture diameter of the sub diaphragm unit 108 through the sub diaphragm opening/closing mechanism (first and second mechanisms) in both the variation of magnification and the focusing.

However, in the focusing, the same rotation amount of the focus connecting key 41 as that of the blade opening/closing member 83 rotated together with the sub diaphragm driving member 39 causes the following problem. The blade opening/closing member 83 has in its identical surface the cam groove portions 83b whose number is the same as that of the diaphragm blades 81. Therefore, a large rotation amount of the focus key 36 or a large number of the diaphragm blades makes it difficult to provide the cam groove portions 83b whose number is the same as that of the diaphragm blades 81 in the identical surface of the blade opening/closing member 83.

For this reason, this embodiment reduces, using a rotation transmitting mechanism described below, the rotation amount of the blade opening/closing member 83 to a smaller rotation amount than that of the focus connecting key 41 (fixed-position rotatable ring 40). Description will be made of the rotation transmitting mechanism with referring to FIGS. 3, 4A and 4B. FIG. 3 illustrates a simplified shape of the guide barrel 27.

As illustrated in FIG. 3, the guide barrel 27 is provided with multiple cam groove portions 27a as third cams, and the fixed-position rotatable ring 40 is also provided with multiple cam groove portions 40c as second cams. The cam followers 43 fixed to the focus connecting ring 42 engage with these cam groove portions 27a and 40c. The rotation of the fixed-position rotatable ring 40 with the focus connecting ring 41 causes the cam groove portions 40c to move the focus connecting ring 42 as an intermediate transmitting member in the optical axis direction and causes the cam groove portions 27a having the slope with respect to the optical axis direction to rotate the focus connecting ring 42. In this operation, the rotation amount of the focus connecting ring 42 is smaller than that of the fixed-position rotatable ring 40.

The focus connecting ring 42 has, as described above, the engaging groove portion 42a engaging with the extending portion 39b of the sub diaphragm driving member 39. Thus, the sub diaphragm driving member 39 is rotated by the same rotation amount as that of the focus connecting ring 42 at the above-described fixed position in the optical axis direction.

Figure 4A:
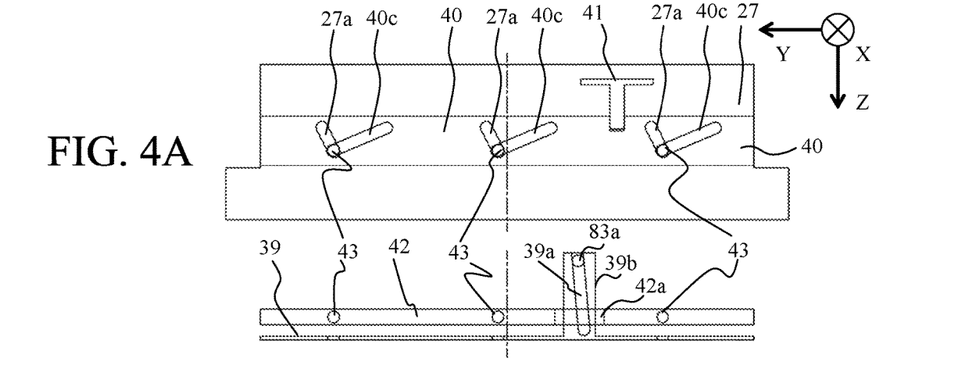
FIGS. 4A to 4C illustrate the configuration of the interchangeable lens of Embodiment 1.
Figure 4B:
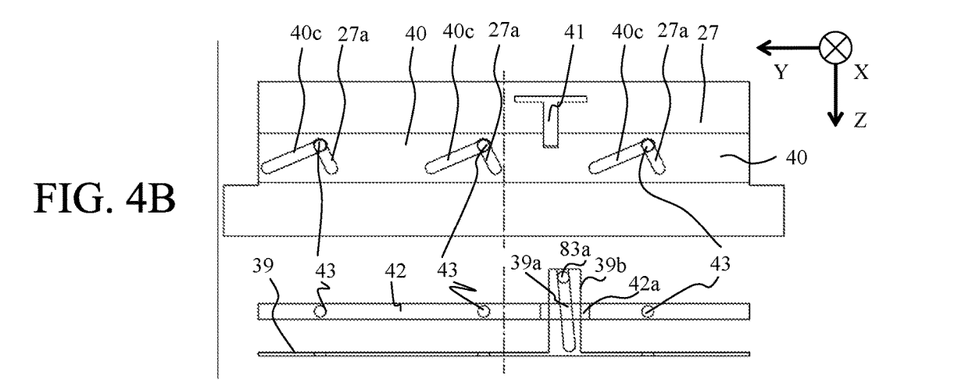

A more easily understandable description will be made of the above-described operation of the rotation transmitting mechanism with referring to FIGS. 4A and 4B. FIGS. 4A and 4B are circumferentially developed views illustrating relations between the guide barrel 27, the focus connecting key 41, the fixed-position rotatable ring 40, the sub diaphragm driving member 39, the blade opening/closing member 83 (cam followers 83a) and the focus connecting ring 42 (cam followers 43) in the focusing. FIG. 4A illustrates a state where the image capturing optical system at a wide-angle end is focused on an infinite distance (hereinafter referred to as "an infinite in-focus state"). FIG. 4B illustrates a state where the image capturing optical system at the wide-angle end is focused on a minimum object distance (hereinafter referred to as "a closest in-focus state").

In the focusing, the rotation of the focus connecting key 41 from the infinite in-focus state illustrated in FIG. 4A to a +Y direction causes the fixed-position rotatable ring 40 to rotate by the same rotation amount as that of the focus connecting key 41 to the +Y direction. As described above, the cam followers 43 provided to the focus connecting ring 42 engage with the cam groove portions 40c of the fixed-position rotatable ring 40 and further engage with the cam groove portions 27a of the guide barrel 27. Each of the cam groove portions 27a has, as described above, the slope with respect to the optical axis direction and has a length in the Y direction shorter than that of each of the cam groove portions 40c in the Y direction.

During the rotation of the fixed-position rotatable ring 40 to a position illustrated in FIG. 4B, the cam followers 43 (that is, the focus connecting ring 42) are moved by the cam groove portions 40c to a −Z direction and are moved by the cam groove portions 27a to the +Y direction. In this rotation, the focus connecting ring 42 is rotated by a rotation amount corresponding to the Y-directional length of each cam groove portion 27a. That is, the rotation amount of the focus connecting ring 42 becomes smaller than the rotation amount, which corresponds to the Y-directional length of each cam groove portion 40c, of the fixed-position rotatable ring 40.

Since the focus connecting ring 42 engages at its engaging groove portion 42a with the extending portion 39b of the sub diaphragm driving member 39, as a result the sub diaphragm driving member 39 is rotated by the rotation amount corresponding to the Y-directional length of the cam groove portion 27a.

Such a configuration enables making the rotation amount of the sub diaphragm driving member 39 smaller than that of the focus connecting key 41. Therefore, even when the rotation amount of the focus connecting key 41 is large, it is possible to provide to the blade opening/closing member 83 the cam groove portions 83a whose number corresponds to that of the diaphragm blades 81.

Figure 4C:
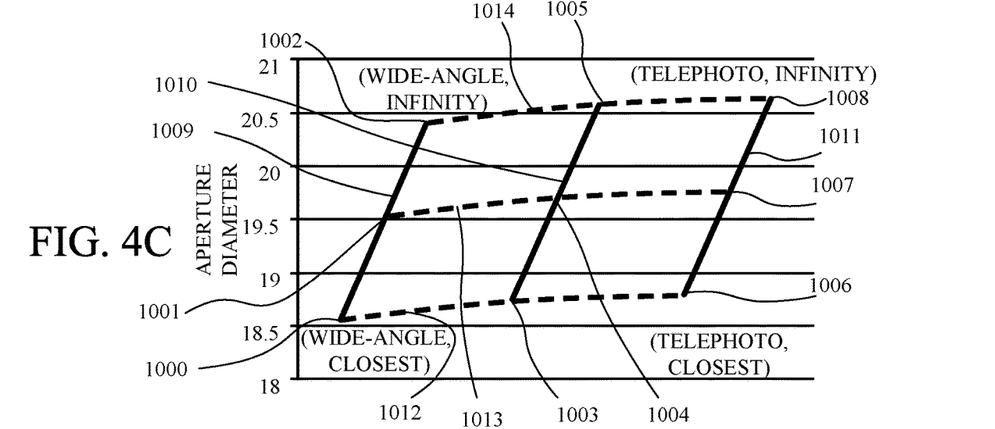

FIG. 4C illustrates changes in aperture diameter of the sub diaphragm unit 108 (the aperture diameter is hereinafter referred to as "a sub aperture diameter") with respect to changes in focal length by the variation of magnification and changes in object distance on which the image capturing optical system is focused (the object distance is hereinafter referred to as "an in-focus object distance") by the focusing. In FIG. 4C, a horizontal axis indicates the focal length, and a vertical axis indicates the sub aperture diameter. The sub aperture diameter increases upward in FIG. 4C.

A first point 1000 indicates a sub aperture diameter when the image capturing optical system at the wide-angle end is in the closest in-focus state. A second point 1001 indicates a sub aperture diameter when the image capturing optical system at the wide-angle end is in a state of focusing on an intermediate object distance (hereinafter referred to as "an intermediate in-focus state). A third point 1002 indicates a sub aperture diameter when the image capturing optical system at the wide-angle end is in the infinite in-focus state. A first solid line 1009 indicates changes in sub aperture diameter for various in-focus object distances in an entire object distance range from a closest end (minimum object distance) to an infinity end (infinite distance) when the image capturing optical system is at the wide-angle end.

A fourth point 1003 indicates a sub aperture diameter when the image capturing optical system at an intermediate focal length position is in the closest in-focus state. A fifth point 1004 indicates a sub aperture diameter when the image capturing optical system at the intermediate focal length position is in the intermediate in-focus state. A sixth point 1005 indicates a sub aperture diameter when the image capturing optical system at the intermediate focal length position is in the infinite in-focus state. A second solid line 1010 indicates changes in sub aperture diameter for the various in-focus object distances in the entire object distance range when the image capturing optical system is at the intermediate focal length position.

A seventh point 1006 indicates a sub aperture diameter when the image capturing optical system at a telephoto end is in the closest in-focus state. An eighth point 1007 indicates a sub aperture diameter when the image capturing optical system at the telephoto end is in the intermediate in-focus state. A ninth point 1008 indicates a sub aperture diameter when the image capturing optical system at the telephoto end is in the infinite in-focus state. A third solid line 1011 indicates changes in sub aperture diameter for the various in-focus object distances in the entire object distance range when the image capturing optical system is at the telephoto end.

A first broken line 1012 indicates changes in sub aperture diameter for various focal lengths in an entire focal length range from the wide-angle end to the telephoto end when the image capturing optical system is in the closest in-focus state. A second broken line 1013 indicates changes in sub aperture diameter for the various focal lengths in the entire focal length range when the image capturing optical system is in the intermediate in-focus state. A third broken line 1014 indicates changes in sub aperture diameter for the various focal lengths in the entire focal length range when the image capturing optical system is in the infinite in-focus state.

In this embodiment, a change amount of the sub aperture diameter when the focal length is changed in the entire focal length range is different from that when the in-focus object distance is changed in the entire object distance range. Specifically, the change amount of the sub aperture diameter when the focal length is changed in the entire focal length range is larger than that when the in-focus object distance is changed in the entire object distance range. Such a relation enables setting the change amount of the sub aperture diameter appropriately both in the variation of magnification and the focusing.

As described above, this embodiment provides the first mechanism to rotate the blade opening/closing member 83 for changing the sub aperture diameter in the variation of magnification and the second mechanism to rotate the blade opening/closing member 83 for changing the sub aperture diameter in the focusing, separately from each other. Therefore, this embodiment can set the sub aperture diameter and the change amount thereof appropriately both in the variation of magnification and the focusing.

Embodiment 2

Next, description will be made of a second embodiment (Embodiment 2) of the present invention. In Embodiment 1, the sub diaphragm driving member 39 is rotatably supported with respect to the guide barrel 27 at the fixed position in the optical axis direction. On the other hand, in this embodiment, a sub diaphragm driving member 39 is rotatably supported with respect to a fifth holding barrel 25 at a fixed position in the optical axis direction. In this embodiment, constituent elements having common functions or roles to those in Embodiment 1 are denoted by the same reference numerals as those in Embodiment 1.

Figure 5A:
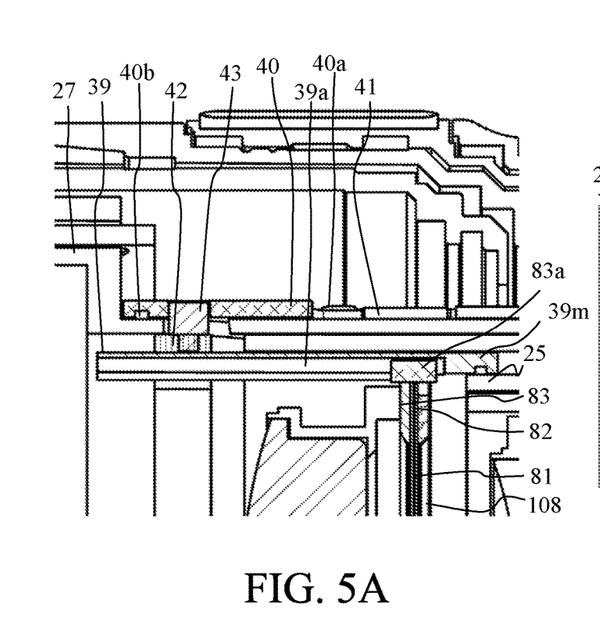
FIGS. 5A to 5C illustrate a configuration of an interchangeable lens that is Embodiment 2 of the present invention.
Figure 5B:
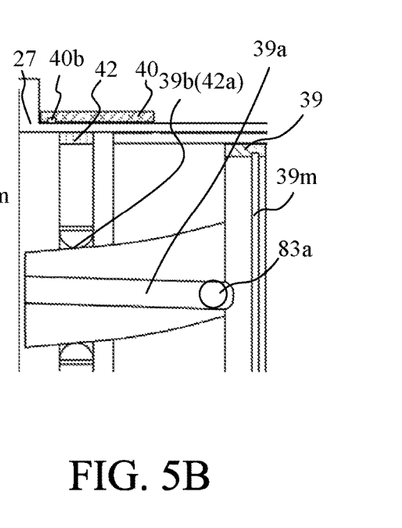

FIGS. 5A and 5B illustrate a configuration of a sub diaphragm unit 108 and its surroundings.

FIG. 5B illustrates a relation between a guide barrel 27, a fixed-position rotatable ring 40, a sub diaphragm driving member 39, a blade opening/closing member 83 (cam follower 83a) and a focus connecting ring 42 when the configuration in FIG. 5A is viewed from below.

Also in this embodiment, the sub diaphragm unit 108 is fixed to a third holding barrel 23 and is moved in the variation of magnification together with the third holding barrel 23 in the optical axis direction. Therefore, in the variation of magnification, the blade opening/closing member 83 provided in the sub diaphragm unit 108 is rotated via the cam follower 83a by a cam groove portion 39a formed in an extending portion 39b of the sub diaphragm driving member 39.

On the other hand, the sub diaphragm driving member 39 is provided with a circumferential groove portion 39m with which a protruding portion (not illustrated) provided to the fifth holding barrel 25 so as to protrude in the radial direction engages. With this configuration, the sub diaphragm driving member 39 is rotatably supported with respect to the fifth holding barrel 25 at the fixed position in the optical axis direction. In the variation of magnification, the sub diaphragm driving member 39 is moved together with the fifth holding barrel 25 in the optical axis direction.

Also in this embodiment, the extending portion 39b of the sub diaphragm driving member 39 has engaging faces engaging with an engaging groove portion 42a of the focus connecting ring 42. However, the engaging faces are formed as cam faces (curved faces) not extending straightly in the optical axis direction and having a slope with respect to the optical axis direction, which is different from Embodiment 1. These cam faces serve as fourth cams. Thus, in the variation of magnification, the movement of the sub diaphragm driving member 39 in the optical axis direction with respect to the focus connecting ring 42 not moved in the optical axis direction and not rotated in the circumferential direction causes a rotation of the sub diaphragm driving member 39 by a cam action between the extending portion 39b and the engaging groove portion 42a. In other words, the cam faces convert a relative movement of the focus connecting ring (intermediate transmitting member) 42 and the sub diaphragm driving member (third rotatable member) 39 in the optical axis direction into the rotation of the sub diaphragm driving member 39 in the circumferential direction with respect to the focus connecting ring 42. The sub diaphragm driving member 39 is rotated in the same direction as that of the blade opening/closing member 83 by the cam groove portions 39a or in a direction opposite thereto.

Accordingly, in the variation of magnification, the blade opening/closing member 83 is rotated by a sum of a rotation amount provided by the cam groove portion 39a of the sub diaphragm driving member 39 and a rotation amount of the sub diaphragm driving member 39 itself. Thus, this embodiment enables, as compared with Embodiment 1, increasing or decreasing the change amount of the sub aperture diameter when the focal length is changed in the entire focal length range.

Furthermore, in the focusing, the focus connecting ring 42 is moved in the optical axis direction via cam followers 43 by cam groove portions 40c provided in the fixed-position rotatable ring 40 and is rotated by cam groove portions 27a provided in the guide barrel 27 in the circumferential direction. The extending portion 39b of the sub diaphragm driving member 39 engages with the engaging groove portion 42a of the focus connecting ring 42, so that the sub diaphragm driving member 39 is rotated in the same direction as that of the focus connecting ring 42. With this rotation, the focus connecting ring 42 is moved in the optical axis direction with respect to the diaphragm driving member 39 unmoved in the optical axis direction together with the fifth holding barrel 25. Thus, the cam action between the extending portion 39b of the sub diaphragm driving member 39 and the engaging groove portion 42a of the focus connecting ring 42 rotates the sub diaphragm driving member 39 with respect to the focus connecting ring 42. In other words, the cam faces of the extending portion 39b convert a relative movement of the focus connecting ring 42 and the sub diaphragm driving member 39 in the optical axis direction into the rotation of the sub diaphragm driving member 39 in the circumferential direction with respect to the focus connecting ring 42. The sub diaphragm driving member 39 is rotated in the same direction as or an opposite direction to that of the focus connecting ring 42.

Accordingly, also in the focusing, the blade opening/closing member 83 rotated by the sub diaphragm driving member 39 is rotated by a sum of the same rotation amount as that of the focus connecting ring 42 and a rotation amount of the sub diaphragm driving member 39 provided by the cam action with respect to the focus connecting ring 42. That is, this embodiment enables, as compared with Embodiment 1, increasing or decreasing the change amount of the sub aperture diameter when the in-focus object distance is changed in the entire object distance range.

Figure 5C:
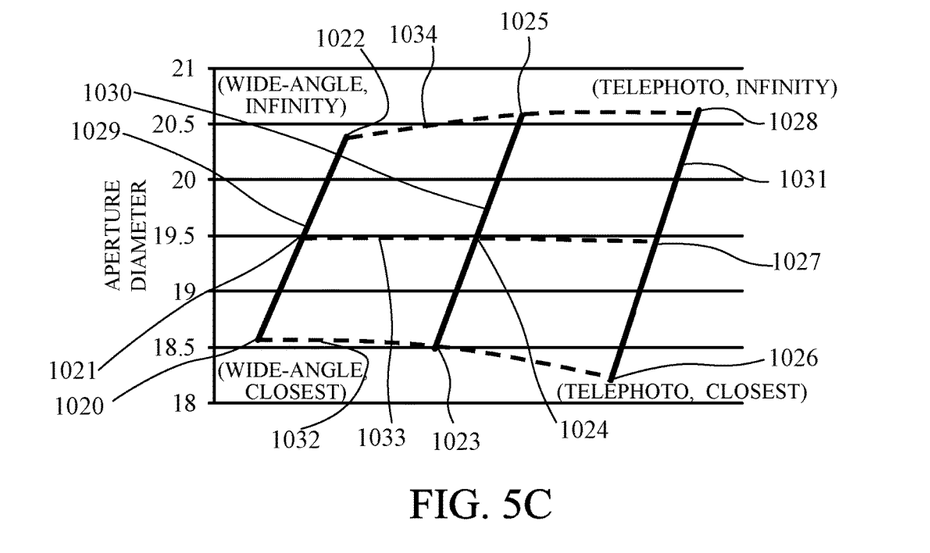

FIG. 5C illustrates changes in sub aperture diameter of the sub diaphragm unit 108 with respect to changes in focal length by the variation of magnification and changes in in-focus object distance by the focusing. In FIG. 5C, a horizontal axis indicates the focal length, and a vertical axis indicates the sub aperture diameter. The sub aperture diameter increases upward in FIG. 5C.

A first point 1020 indicates a sub aperture diameter when an image capturing optical system of this embodiment at a wide-angle end is in a closest in-focus state. A second point 1021 indicates a sub aperture diameter when the image capturing optical system at the wide-angle end is in an intermediate in-focus state. A third point 1022 indicates a sub aperture diameter when the image capturing optical system at the wide-angle end is in an infinite in-focus state. A first solid line 1029 indicates changes in sub aperture diameter for various in-focus object distances in an entire object distance range from a closest end to an infinity end when the image capturing optical system is at the wide-angle end.

A fourth point 1023 indicates a sub aperture diameter when the image capturing optical system at an intermediate focal length position is in the closest in-focus state. A fifth point 1024 indicates a sub aperture diameter when the image capturing optical system at the intermediate focal length position is in the intermediate in-focus state. A sixth point 1025 indicates a sub aperture diameter when the image capturing optical system at the intermediate focal length position is in the infinite in-focus state. A second solid line 1030 indicates changes in sub aperture diameter for the various in-focus object distances in the entire object distance range when the image capturing optical system is at the intermediate focal length position.

A seventh point 1026 indicates a sub aperture diameter when the image capturing optical system at a telephoto end is in the closest in-focus state. An eighth point 1027 indicates a sub aperture diameter when the image capturing optical system at the telephoto end is in the intermediate in-focus state. A ninth point 1028 indicates a sub aperture diameter when the image capturing optical system at the telephoto end is in the infinite in-focus state. A third solid line 1031 indicates changes in sub aperture diameter for the various in-focus object distances in the entire object distance range when the image capturing optical system is at the telephoto end.

A first broken line 1032 indicates changes in sub aperture diameter for various focal lengths in an entire focal length range from the wide-angle end to the telephoto end when the image capturing optical system is in the closest in-focus state. A second broken line 1033 indicates changes in sub aperture diameter for the various focal lengths in the entire focal length range when the image capturing optical system is in the intermediate in-focus state. A third broken line 1034 indicates changes in sub aperture diameter for the various focal lengths in the entire focal length range when the image capturing optical system is in the infinite in-focus state.

Also in this embodiment, the change amount of the sub aperture diameter when the focal length is changed in the entire focal length range is larger than that when the in-focus object distance is changed in the entire object distance range. Furthermore, in this embodiment, a change amount (third solid line 1031) of the sub aperture diameter when the in-focus object distance is changed in the entire object distance range at the telephoto end and a change amount (first broken line 1032) of the sub aperture diameter when the focal length is changed in the entire focal length range in the closest in-focus state are larger than those in Embodiment 1. On the other hand, a change amount (second broken line 1033) of the sub aperture diameter when the focal length is changed in the entire focal length range in the intermediate in-focus state is smaller than that in Embodiment 1.

As just described, this embodiment enables setting the sub aperture diameter and the change amount thereof in the variation of magnification and the focusing so as to be different from those in Embodiment 1.

Although this embodiment described the case of changing in the focusing the rotation amount of the sub diaphragm driving member 39 (that is, the change amount of the sub aperture diameter) by the cam action between the extending portion 39b of the sub diaphragm driving member 39 and the engaging groove portion 42a of the focus connecting ring 42 depending on the focal length in the focusing, another configuration may be employed that changes in the focusing the rotation amount of the focus key 36 to change the change amount of the sub aperture diameter depending on the focal length.

As described above, each of Embodiments 1 and enables changing the aperture diameter of the sub diaphragm unit (first aperture stop unit) in both the variation of magnification and the focusing without using an actuator dedicated for the sub diaphragm unit. Thus, even when the main diaphragm unit (second aperture stop unit) driven by its actuator is provided separately from the sub diaphragm unit, it is possible to prevent an increase in size of the lens barrel.

Moreover, although each of Embodiments 1 and described the case of providing the main and sub diaphragm units to the lens barrel for the interchangeable lens, these main and sub diaphragm units may be provided to a lens barrel of a lens-integrated image capturing apparatus as an optical apparatus.

In addition, in each of the above embodiments, the first rotatable member rotating about the optical axis moves the focusing lens in the optical axis direction in focusing. Furthermore, the in variation of magnification, the first aperture stop unit is relatively moved with respect to the third rotatable member in the optical axis direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-231157, filed on Nov. 26, 2015, which is hereby incorporated by reference herein in its entirety.

What is claimed is:

1. A lens barrel comprising:
a magnification-varying lens movable in an optical axis direction, in which an optical axis of the lens barrel extends, to perform variation of magnification;
a focusing lens movable in the optical axis direction to perform focusing;
a first rotatable member rotatable in a circumferential direction about the optical axis to move the focusing lens in the optical axis direction;
a first aperture stop unit including a first light-blocking member and a second rotatable member rotatable in the circumferential direction to move the first light-blocking member;
a third rotatable member to be rotated in the circumferential direction by receiving a rotation of the first rotatable member;
a first mechanism configured to, in the variation of magnification, convert a relative movement of the second and third rotatable members in the optical axis direction into a rotation of the second rotatable member in the circumferential direction; and
a second mechanism configured to, in the focusing, transmit the rotation of the first rotatable member to the third rotatable member to rotate the third rotatable member and transmit the rotation of the third rotatable member to the second rotatable member to rotate the second rotatable member.

2. A lens barrel according to claim 1, wherein:
the first rotatable member is rotated in the circumferential direction with a movement of the focusing lens in the optical axis direction; and
the first aperture stop unit is moved in the optical axis direction with a movement of the magnification-varying lens in the optical axis direction.

3. A lens barrel according to claim 1, wherein:
the first mechanism includes a first cam provided in one of the second and third rotatable members and a cam follower provided in another of the second and third rotatable members, the cam follower engaging with the first cam, the first mechanism being configured to convert a relative movement of the first cam and the cam follower into the rotation of the second rotatable member; and
the second mechanism is configured to transmit the rotation of the third rotatable member, which is rotated by receiving the rotation of the first rotatable member, to the second rotatable member by an engagement of the first cam with the cam follower in the circumferential direction.

4. A lens barrel according to claim 1, wherein the second mechanism includes a rotation transmitting mechanism configured to transmit the rotation of the first rotatable member to the third rotatable member so as to make a rotation amount of the third rotatable member smaller than that of the first rotatable member.

5. A lens barrel according to claim 4, wherein the rotation transmitting mechanism includes:
an intermediate transmitting member movable in the optical axis direction with respect to the third rotatable member and engaging with the third rotatable member in the circumferential direction;
a second cam rotatable with the first rotatable member in the circumferential direction to cause the intermediate transmitting member to move in the optical axis direction; and
a third cam to cause the intermediate transmitting member moving in the optical axis direction to rotate in the circumferential direction,
wherein in the circumferential direction the third cam has a longer length than that of the second cam.

6. A lens barrel according to claim 5, further comprising a fourth cam to convert a relative movement of the intermediate transmitting member and the third rotatable member in the optical axis direction into the rotation of the third rotatable member in the circumferential direction with respect to the intermediate transmitting member.

7. A lens barrel according to claim 1, wherein a change amount in size of an aperture formed by the first light-blocking member when the variation of magnification from a wide-angle end to a telephoto end is performed is different from that when the focusing from a closest end to an infinity end is performed.

8. A lens barrel according to claim 1, further comprising a second aperture stop unit including a second light-blocking member and an actuator to move the second light-blocking member.

9. An optical apparatus provided with a lens barrel, the lens barrel comprising:
a magnification-varying lens movable in an optical axis direction, in which an optical axis of the lens barrel extends, to perform variation of magnification;
a focusing lens movable in the optical axis direction to perform focusing;
a first rotatable member rotatable in a circumferential direction about the optical axis to move the focusing lens in the optical axis direction;

a first aperture stop unit including a first light-blocking member and a second rotatable member rotatable in the circumferential direction to move the first light-blocking member;

a third rotatable member to be rotated in the circumferential direction by receiving a rotation of the first rotatable member;

a first mechanism configured to, in the variation of magnification, convert a relative movement of the second and third rotatable members in the optical axis direction into a rotation of the second rotatable member in the circumferential direction; and a second mechanism configured to, in the focusing, transmit the rotation of the first rotatable member to the third rotatable member to rotate the third rotatable member and transmit the rotation of the third rotatable member to the second rotatable member to rotate the second rotatable member.

\* \* \* \* \*